Sept. 11, 1962     J. H. ANDRESEN, JR     3,053,162
AUXILIARY PRESSURE MONITOR FOR CABIN PRESSURIZATION SYSTEMS
Filed March 26, 1958     3 Sheets-Sheet 1

INVENTOR.
JOHN H. ANDRESEN, JR.
BY
ATTORNEYS

Sept. 11, 1962  J. H. ANDRESEN, JR  3,053,162
AUXILIARY PRESSURE MONITOR FOR CABIN PRESSURIZATION SYSTEMS
Filed March 26, 1958  3 Sheets-Sheet 2

INVENTOR.
JOHN H. ANDRESEN, JR.
BY
ATTORNEYS

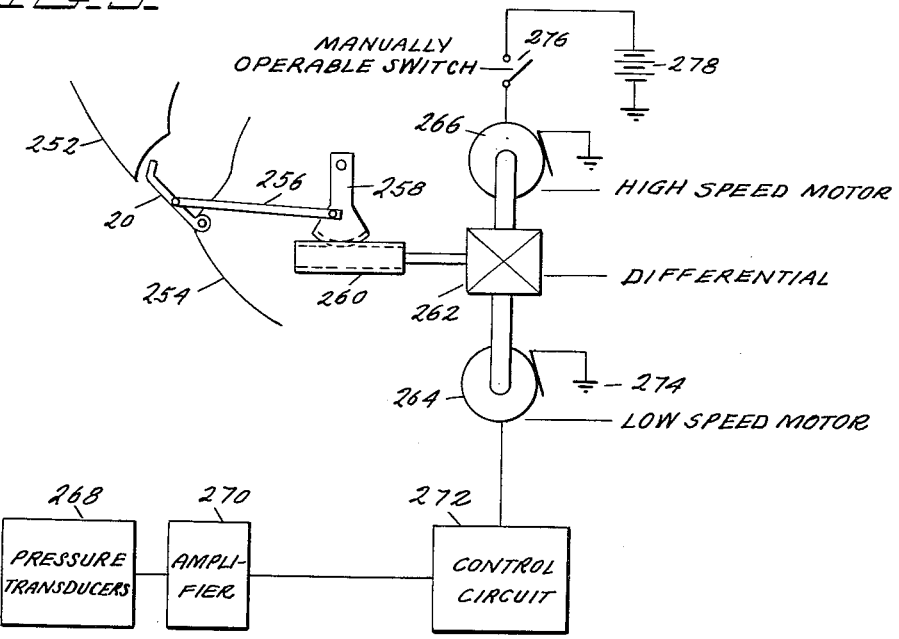
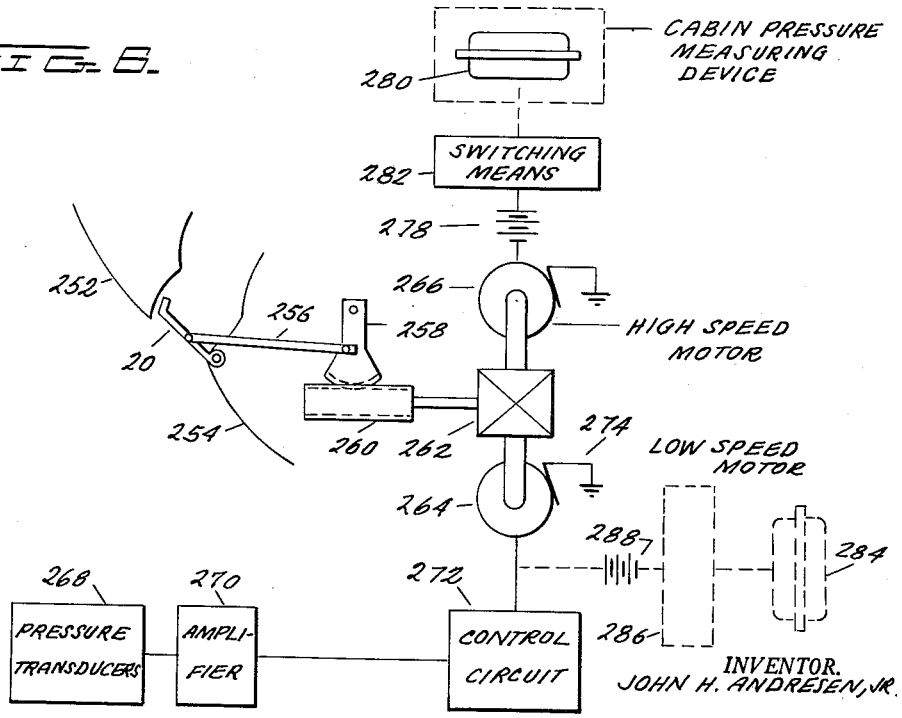

United States Patent Office 3,053,162
Patented Sept. 11, 1962

3,053,162
AUXILIARY PRESSURE MONITOR FOR CABIN
PRESSURIZATION SYSTEMS
John H. Andresen, Jr., Greenwood Lake, N.Y., assignor to Kollsman Instrument Corporation, Elmhurst, N.Y., a corporation of New York
Filed Mar. 26, 1958, Ser. No. 724,133
3 Claims. (Cl. 98—1.5)

This invention relates to the use of an auxiliary pressure monitor for cabin pressurization systems and more specifically relates to the use of an independent pressure monitor which monitors the cabin pressure and automatically operates the cabin pressure control means to bring the cabin pressure back to normal values when the cabin pressure changes beyond a predetermined limit.

Cabin pressurization systems are well known and generally comprise a supercharger for bringing air into the cabin and an exhaust valve system for exhausting air from the cabin. In order to control pressure conditions within the cabin, the supercharger or the exhaust valve is controlled as a function of rate of change of cabin pressure, cabin pressure, and the differential pressure or the pressure difference between the cabin pressure and the altitude pressure. One such system is shown in copending application, Serial No. 647,116 filed March 19, 1957, now Patent Number 2,983,211 and assigned to the assignee of the instant invention, wherein the cabin pressure is controlled by varying the position of the air exhaust valve of the pressurized cabin. However, it is to be understood that control of the cabin pressure could be controlled by controlling the amount of air brought into the cabin by the supercharger or by any combination of supercharger control and exhaust valve control.

If the automatic cabin pressurization system fails, it is possible that the air exhaust valve or supercharger control will be left in a condition which will allow the cabin pressure to fall below some predetermined value. With the occurrence of this condition both the operator of the aircraft and his passengers are subjected to a lack of oxygen which will first dull their senses and thereafter cause unconsciousness. As the cabin pressure decreases these physiological effects proceed more rapidly, and below certain pressures it proceeds so fast that pilots are unable to take positive corrective action.

The principal object of my invention is to provide an auxiliary pressure monitor for pressurized cabins which, when there is a failure within the automatic cabin pressurization system and the cabin pressure falls to dangerously low values, will automatically cut in a source of power which will operate either the supercharger or the exhaust valve in such a manner as to bring cabin pressurization back to a safe value independently of any action on the part of the pilot.

Accordingly, my novel invention could operate so that auxiliary valve or supercharger means will assume control of the cabin pressure whenever the cabin altitude is measured at 10,000 feet or more, which value is thought to be the maximum allowable cabin altitude within which passengers can efficiently operate.

In one embodiment of my novel invention the auxiliary pressure monitoring means may be coordinated with the dual valve control operating system set forth in copending application Serial No. 647,116, filed March 19, 1957 and now Patent No. 2,983,211 and assigned to the assignee of the instant invention, wherein cabin pressure is controlled from a typical cabin pressure monitoring system which drives a relatively slow operating motor. However, the valve control is connected through a differential to the slow operating motor as well as a fast operating motor, which fast operating motor can be switched in under emergency conditions to obtain quick valve actions. Hence, my novel auxiliary pressure monitoring device could be connected to operate the fast operating motor so that the cabin pressure can be brought back to comfortable positions as fast as possible.

Accordingly, the primary object of my invention is to provide a novel safety feature for cabin pressurization systems which operate independently of the cabin pressurization system components.

Another object of my invention is to provide a novel auxiliary pressure monitor for cabin pressurization systems which is operative independently of the cabin pressurization system when the cabin pressure decreases below a predetermined value.

Still another object of this invention is to provide a novel auxiliary monitor which measures cabin pressure and operates either the cabin pressure valve or air inlet means to increase the cabin pressure once the cabin pressure decreases to a predetermined value.

Another object of my invention is to provide an auxiliary cabin pressure monitor which operates to maintain cabin pressure at a safe value when the normal cabin pressurization system fails.

A still further object of my invention is to operate the exhaust valve of a cabin pressurization system from a fast operating motor which is energized responsive to the measurement by an auxiliary pressure monitor of a cabin pressure which is below a predetermined value.

These and other objects of my invention will become apparent from the following description when taken in conjunction with the drawings in which:

FIGURE 1 schematically shows a typical pressurization system.

FIGURE 4b shows a connection diagram for the windings of FIGURE 4a.

FIGURE 5 shows the novel use of a high speed and low speed motor for valve control.

FIGURE 6 shows the novel use of an auxiliary pressure monitor for monitoring cabin pressure independently of the pressure control system.

Figure 1:
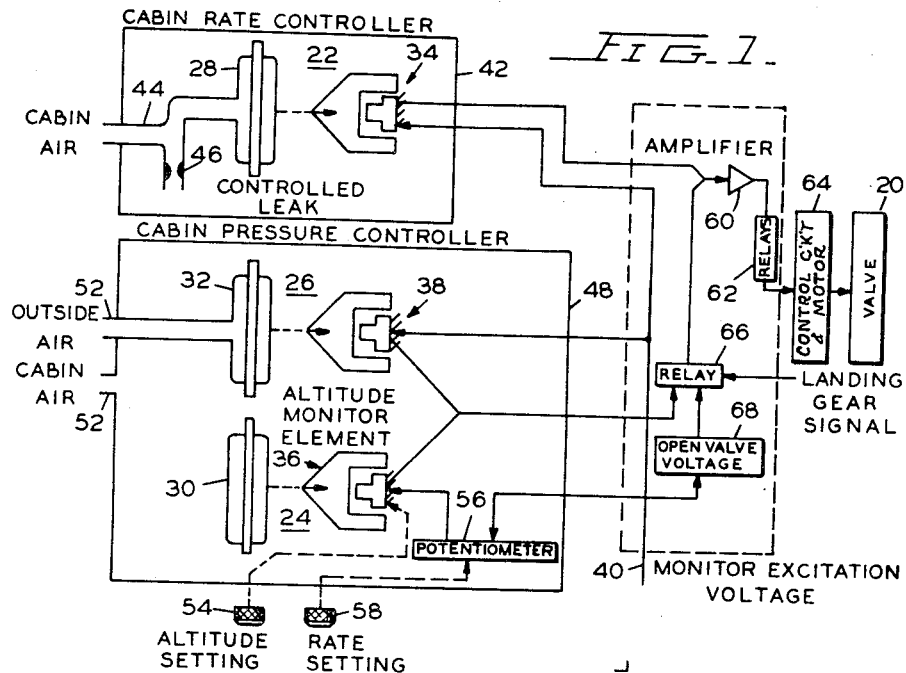

One type of pressurization system to which the invention may be applied, as seen in FIGURES 5 and 6, is schematically shown in FIGURE 1 wherein valve 20 which could be an exhaust valve of a pressurized cabin is to be controlled in accordance with the pressures measured by rate of change of pressure monitor 22, cabin pressure monitor 24 and differential pressure monitor 26.

While FIGURE 1 shows the pressure control as taking place at the exhaust valve, it is to be noted that the invention could also be easily applied to supercharger operation.

Each of the pressure monitors, the construction of which will be described more fully hereinafter, is activated by a diaphragm capsule 28, 30 and 32, respectively, which by controlling an impedance element controls the output of devices 34, 36 and 38, respectively, which are energized from the input line or source of monitor excitation voltage 40.

The rate of cabin pressure change monitor 22 is positioned within a housing or case 42 and the interior of diaphragm 28 is subjected to cabin pressure through line 44. The line 44 is further provided with a controlled leak 46 leading into the case 42. The diaphragm capsule will then, as well known in the art, position its diaphragm in accordance with the rate of change of the cabin pressure. The electrical output of device 34 which is varied by diaphragm capsule 28 is, therefore, a function of the rate of change of cabin pressure.

More specifically, for zero vertical speed, pressures inside and outside diaphragm capsule 28 are the same.

During change in altitude, pressure inside the diaphragm changes immediately, but the case pressure lags behind because of the small orifice or controlled leak 46 and the large case volume. This causes a differential pressure across the diaphragm which is roughly proportional to the vertical speed at all altitudes.

Both the differential pressure monitor 26 and altitude monitor 24 are positioned within box 48, the interior of which is connected to the cabin pressure through line 50 with the interior of diaphragm capsule 30 being evacuated while the interior of diaphragm capsule 32 is connected to the flight altitude pressure through line 52.

Thus, the diaphragm of diaphragm capsule 32 is positioned in accordance with the pressure difference between the cabin air pressure and the flight or external pressure. Since the output of device 38 is controlled by diaphragm capsule 32, the electrical output of device 38 depends on the pressure differential.

Figure 2:
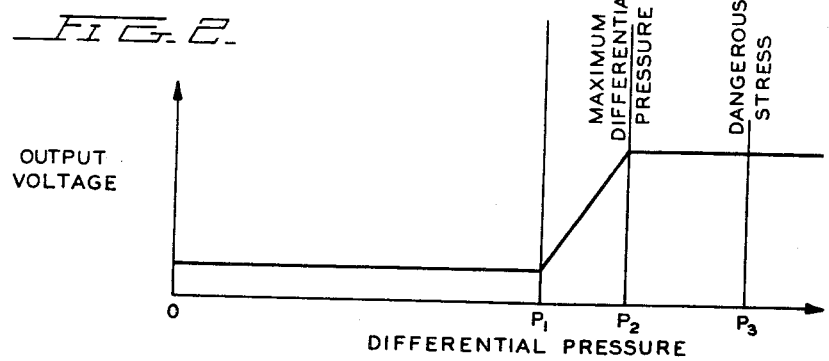
FIGURE 2 shows a curve of output voltage as a function of differential pressure for the differential pressure monitor.

It is desirable that the output of differential pressure monitor 26 is similar to that shown in FIGURE 2, this characteristic being relatively easy to obtain with judicious circuit design.

In FIGURE 2 it is seen that at point $P_1$, when the differential pressure approaches too high a value, a signal is initiated by the differential pressure monitor which as will be seen in FIGURE 1 will cause the cabin valve to move to relieve this pressure difference. As the differential pressure continues to increase, a correspondingly stronger signal is obtained from the differential pressure monitor until at $P_2$, or the maximum permissible differential below the point $P_3$ at which the air frame will rupture, the signal achieves a maximum.

As heretofore mentioned, diaphragm capsule 30 is subjected only to cabin pressure and its diaphragm position will vary accordingly. Hence, the output voltage of device 36 which is varied by diaphragm capsule 30 is a function of cabin pressure.

As will be seen more fully hereinafter, device 36 is of the balanceable type wherein the output depends on the degree of unbalance. In order to adjust the cabin pressure to a predetermined point, a knob 54 is connected to vary the balance point or zero output point of device 36.

The input voltage from line 40 to device 36 is controlled by potentiometer 56 and is controlled by knob 58. As will be presently seen, the adjustment of the input voltage to device 36 by knob 58 determines the maximum rate of change of cabin voltage.

During normal automatic operating conditions, the outputs of altitude monitor 36 and rate of pressure monitor 34 are connected in opposing relationship with one another, the net signal being impressed upon amplifier 60. The output voltage of amplifier 60 then controls relays 62 which in turn control operation of the control circuits and motor drive means 64 to which the instant invention is directed, as will be described more fully hereinafter, to thereby ultimately control exhaust valve 20.

When changing from one altitude setting to another by varying knob 54, the balance device 36 is changed and there is an output voltage from device 36. It is to be noted that device 36 can be constructed so that its output is at a maximum for a small deviation from the predetermined pressure. Thus, as seen in FIGURE 3, at time $t_1$, the cabin altitude is changed from $A_1$ to $A_2$.

The output voltage of device 36 is now impressed on amplifier 60 and operates to vary valve 20 which in turn varies the cabin pressure. Because of the change in cabin pressure, there will be a proportional output from device 34 which is equal and opposite to the maximum output signal of device 36, the maximum rate of change of cabin pressure being dependent upon the maximum output voltage of device 36. This, however, depends on the input voltage which is controlled by potentiometer 56 whereby adjustment of potentiometer 56 by knob 58 will adjust the maximum rate of change of pressure or the slope $dA/d_t$ of FIGURE 3.

As the cabin pressure approaches its predetermined value, the unbalance of device 36 of FIGURE 1 will decrease and its output voltage will decrease accordingly. Hence, the position of valve 20 will be altered until the output of device 34 is decreased accordingly.

Figure 3:
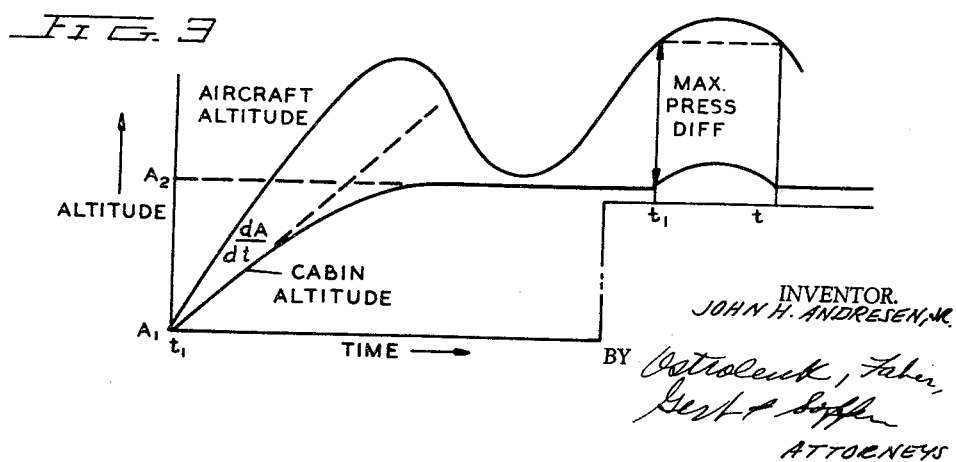
FIGURE 3 shows a curve of altitude as a function of time for the system of FIGURE 1.

This operation will then proceed and as seen in FIGURE 3, the cabin pressure will slowly approach the new altitude setting $A_2$.

Further reference to FIGURE 3 shows that the cabin pressure is maintained relatively constant even though the flight altitude varies. Clearly, the cabin pressure is maintained at this constant value by the coordinated operation of devices 34 and 36 in a manner similar to that set forth above.

FIGURE 1 further shows the differential pressure monitor 38 as being connected to operate relay 66 responsive to an excessive pressure differential. Operation of relay 66 connects "open valve" voltage source 68 to amplifier 60, this voltage being large enough to overcome the output voltages of devices 34 and 36.

Upon measuring too large a pressure differential as at time $t_1$ of FIGURE 3, voltage source 68 is connected to amplifier 60 to activate valve 20 and decrease the pressure differential. At time $t_2$, when the aircraft altitude decreases sufficiently to permit automatic operation to proceed the cabin pressure is returned to the predetermined value $A_2$.

Since it is desirable to equalize cabin pressure and flight pressure prior to landing, relay 66 is also operated responsive to operation of the landing gear whereby voltage source 68 is connected to amplifier 60 to operate valve 20 and allow depressurization to proceed at some comfortable rate given by the open valve voltage source 68.

Figure 4:
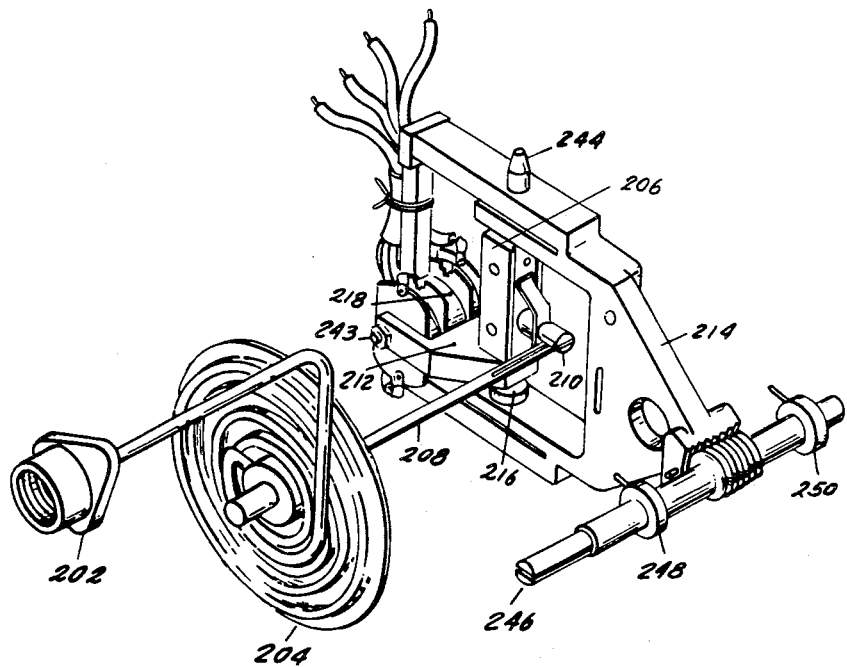
FIGURE 4 shows a perspective view of one type of pressure monitor or pressure transducer which can be used in this invention.
Figure 4A:
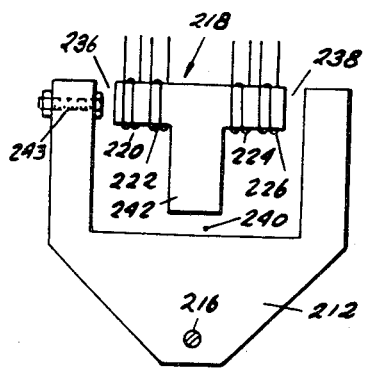
FIGURE 4a shows a top cross-sectional view taken through the armature of FIGURE 4.

The construction of the pressure monitors such as monitors 22, 24 and 26 of FIGURE 1 is set forth in FIGURES 4 and 4a wherein FIGURE 4a is a sectional view taken through the armature and field members of the perspective view of FIGURE 4 for the case of a differential pressure monitor.

Referring first to FIGURE 4, a pressure fitting 202 feeds one pressure to the inside of the diaphragm 204. A second pressure, which is the pressure inside the case housing the device of FIGURE 4 acts on the outside of diaphragm 204.

Clearly, in an altitude monitor, diaphragm 204 will be evacuated and the pressure is fed to the inside of the instrument case to act on the outside of diaphragm 204, while in a rate monitor, a diaphragm with a controlled leak is used as was described hereinbefore, and the pressure is fed to the case.

The diaphragm 204 is attached to the rocking shaft 206 by means of link 208 and calibrating arm 210. If desired, link 208 may be attached to a temperature compensator (not shown) on either the diaphragm centerpiece or the rocking shaft 206.

The rocking shaft 206 is directly connected to armature structure 212 (see FIGURE 4a) which is pivotally mounted on the yoke 214 at the pivotal mounting structure 216.

Thus as the pressure applied to diaphragm 204 varies, the diaphragm expands or contracts to rotate the rocking shaft 206 and C-shaped armature 212 with respect to the yoke 214.

A field structure 218 is then mounted on the yoke 214 and, as best seen in FIGURE 4a, comprises a T-shaped magnetic structure nested within the C-shaped armature 212. The two upper legs of the T of field structure 218 then have two windings 220, 222, and 224, 226 respectively wound thereon, as shown in FIGURE 4a, these windings being connected as shown in FIGURE 4b to form a bridge circuit having input terminals 228 and 230 and output terminals 232 and 234.

In view of this structure, the inductance of coils 220 and 222 may be varied with respect to the inductance of coils 224 and 226 by varying the angular position of armature 212 with respect to the field structure 218 to thereby change the airgaps 236 and 238 of FIGURE 4a and thus change the reluctance of their respective magnetic circuits.

Thus in one embodiment the air gaps 236 and 238 are large with respect to air gap 240 whereby the magnetic circuit of each pair of coils will have a relatively large amount of flux passing through the center leg 242 of field structure 218. When, however, structure 212 is rotated about pivot point 216 with respect to field structure 218, one of the air gaps 236 or 238 will increase while the other decreases whereby the inductance of one pair of coils will decrease and the inductance of the other pair will increase respectively. This rotation can, if desired, be limited by adjustable stops such as adjustable stop 243 of FIGURES 4 and 4a.

Figure 4B:
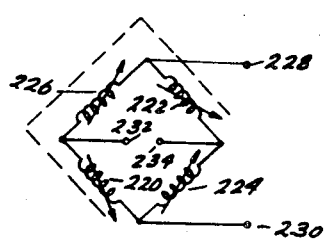

Hence, the bridge circuit of FIGURE 4b will be unbalanced by a variation of pressure applied to diaphragm 204 to a degree depending on the magnitude of variation of the diaphragm dimensions.

In order to allow initial adjustment of the bridge of FIGURE 4b, the yoke 214 of FIGURE 4 is pivotally mounted at pivot 244 which is coaxial with pivot 216 and the yoke is threadably engaged by an adjustable setting shaft 246. The adjustable setting shaft 246 is manually operable and includes the non-jamming stops 248 and 250 which limit its motion. In operation, rotation of shaft 246 will cause an angular displacement between the field structure 218 carried by the yoke, and the armature structure 212 which is maintained in its angular position through the link 208 and rocking shaft 206.

In the rate monitor, the shaft 246 is adjusted at assembly to have the bridge give a null output for zero vertical speed. The voltage output thereafter is due solely to the motion of the diaphragm 204 and the armature 212.

It is to be noted that link 208 is slotted to permit the diaphragm 204 to continue to move after the field structure engages a stop means such as stop means 243 of field structure 212. Furthermore, backlash in the mechanism may be taken up by a series of coil springs (not shown) while an adjustable counter weight balances the movable parts.

The novel use of both a high speed motor and a low speed motor connected through a differential to control the valve 20 is seen to be positioned in the surface of the air frame indicated generally at locations 252 and 254 of FIGURE 5. The valve is pivotally connected to a connecting link 256 which has its other end fastened to a pivotally mounted sector gear 258 which engages a worm gear 260. The worm gear 260 is rotatably driven from the spider of a differential 262 which has its input members connected to a low speed motor 264 and a high speed motor 266, either of which may rotate the worm gear 260 to thereby adjustably position the valve 20.

The low speed motor 264 is the motor which normally positions the valve for control of the cabin pressurization operation as above described in conjunction with FIGURE 1. That is to say, the pressure transducer system schematically illustrated in box 268 operates through the amplifier 270 to energize control circuit 272 in some desired manner so that the control circuit will connect operating potentials with respect to ground 274 which will operate motor 264 in some desired manner for the ultimate positioning of valve member 20. Clearly, the pressure transducers 268 and amplifier 270 as well as the control circuit 272 are the same components as have been above described in FIGURE 1, and their operation will be that previously described.

Since, however, it is possible that there will be some failure in the automatic pressurization system, it is desirable that auxiliary valve operating means be available to the pilot for rapidly operating the valve 20 for purposes of increasing or, in some cases, decreasing the cabin pressure. For most practical purposes the operation of this safety device will be to increase the cabin pressure as fast as possible and before the pilot loses consciousness or good control of his senses due to sudden depressurization conditions.

This emergency operation is obtained through the use of a high speed motor 266 which is connected to the differential 262 to drive the valve 20 through the worm gear 260 independently of the low speed motor 264. Thus, a manually operable switch 276 may be conveniently positioned on a pilot's control panel to connect an auxiliary power source 278 to the high speed motor 266 whereby high speed operation of valve member 20 is obtained. Hence, even though violent depressurization may occur in the aircraft pressurized cabin, the pilot may quickly operate the manual switch 276 to cause valve 20 to be operated to its closed position so that cabin pressure may be restored as rapidly as possible.

It is to be noted that both the manually operable switch 276 as well as the auxiliary power source 278 are independent of the other pressurization control equipment so that they would not be likely to be put out of service when there is a failure in the automatic control means.

FIGURE 6 is based on FIGURE 5, and like components have been identified with similar numerals, and shows the novel use of an auxiliary pressure monitoring device which serves the purpose of switch 276 of FIGURE 5. In FIGURE 6 the auxiliary pressure monitor comprises a diaphragm capsule 280 which is operatively connected to operate switching means 282. Operation of switching means 282 connects the auxiliary power source 278 to the high speed motor 266. Hence, motor 266 is energized responsive to the measurement of a pressure by the capsule 280 which is lower than some predetermined value.

Here again, the diaphragm capsule 280, its switching means 282 and the power source 278 are independent of the automatic pressurization mechanism and would thereby be operative even though the automatic mechanism failed.

It may be preferable to use the system set forth in FIGURE 6 over that set forth in FIGURE 5, for if the depressurization of the cabin is violent enough it is possible that the pilot would not have time to reach for his manually operable switch to cause a closure of valve 20. With the system of FIGURE 6, however, the cabin pressure is continuously and automatically monitored independently of the pilot and would cause an automatic operation of the high speed motor 266 responsive to a decrease of cabin pressure below some predetermined value.

While FIGURE 6 shows the novel auxiliary pressure monitoring device as being connected to operate the high speed motor 266, the auxiliary pressure monitor could be connected to operate the low speed motor which is utilized in the automatic positioning of valve 20. Thus, as is shown in dotted lines in FIGURE 6, an existing cabin pressurization system can be modified with the mere addition of a diaphragm capsule 284 which is identical to the capsule 280 and a switching means 286 which is identical to the switching means 282, whereby the auxiliary power source 288 will be connected to the low speed motor 264 to cause a closure of the valve 20 and restoration of cabin pressure.

Although I have described preferred embodiments of my novel invention, many variations and modifications will now be obvious to those skilled in the art, and I pre-

I claim:

1. In a cabin pressurization system for controlling the pressure within a pressurized cabin comprising means for bringing air into said cabin and exhaust valve means for exhausting air from said cabin, a first control means operatively connected to said valve to adjustably position said valve and pressure monitoring means connected to said first control means for automatically positioning said valve to maintain predetermined pressure conditions within said cabin; a second control means and an auxiliary pressure monitor; said auxiliary pressure monitor measuring the pressure within said cabin; said second control means being operatively connected to said exhaust valve and operable independently of said pressure monitoring means, said auxiliary pressure monitor being connected to said second control means to energize said second control means when said auxiliary pressure monitor measures a cabin pressure which is below a predetermined value; said first control means comprising a low speed output motor, said second control means comprising a high speed output motor.

2. In a cabin pressurization system for controlling the pressure within a pressurized cabin comprising means for bringing air into said cabin and exhaust valve means for exhausting air from said cabin, a first control means operatively connected to said valve to adjustably position said valve and pressure monitoring means connected to said first control means for automatically positioning said valve to maintain predetermined pressure conditions within said cabin; a second control means and an auxiliary pressure monitor; said auxiliary pressure monitor measuring the pressure within said cabin; said second control means being operatively connected to said exhaust valve and operable independently of said pressure monitoring means, said auxiliary pressure monitor being connected to said second control means to energize said second control means when said auxiliary pressure monitor measures a cabin pressure which is below a predetermined value; said first control means comprising a low speed output motor, said second control means comprising a high speed output motor; said first and second control motors being connected to said exhaust valve means through mechanical differential mechanism.

3. An auxiliary pressure monitor for a pressurized cabin; said pressurized cabin containing means for bringing air into said cabin and means for exhausting air from said cabin, and pressure control means for controlling the difference in volumes of air brought into and exhausted from said cabin for adjustably controlling the pressure of said cabin; a first motor means operatively connected to said pressure control means for adjusting said pressure control means responsive to measured pressure conditions in said cabin, a second motor means operatively connected to said pressure control means for adjusting said pressure control means, said auxiliary pressure monitor measuring the pressure within said cabin, said second motor means being connected to said auxiliary pressure monitor to be energized by said auxiliary pressure monitor only when cabin pressure decreases below a predetermined value said auxiliary pressure monitor overriding the control of said pressure control means when energizing said control means; said first motor means operating said pressure control means at a relatively slow rate, said second motor means operating said pressure control means at a relatively fast rate.

References Cited in the file of this patent

UNITED STATES PATENTS

| | | |
|---|---|---|
| 2,265,461 | Wagner | Dec. 9, 1941 |
| 2,407,257 | Del Mar | Sept. 10, 1946 |
| 2,413,027 | Maxson | Dec. 24, 1946 |
| 2,510,976 | Herrala et al. | June 13, 1950 |
| 2,549,690 | Klemperer | Apr. 17, 1951 |
| 2,578,539 | Green | Dec. 11, 1951 |
| 2,585,295 | Baak | Feb. 12, 1952 |
| 2,754,745 | Arthur | July 17, 1956 |